US007496107B1

(12) United States Patent
Watson

(10) Patent No.: US 7,496,107 B1
(45) Date of Patent: *Feb. 24, 2009

(54) MECHANISM FOR IMPLEMENTING VOICE OVER IP TELEPHONY BEHIND NETWORK FIREWALLS

(75) Inventor: Clinton Watson, 303 Twin Dolphin Dr., Redwood Shores, CA (US) 94065

(73) Assignee: Clinton Watson, Redwood Shores, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 11/316,012

(22) Filed: Dec. 19, 2005

Related U.S. Application Data

(60) Division of application No. 10/693,107, filed on Oct. 24, 2003, now Pat. No. 7,009,984, which is a continuation of application No. 10/164,503, filed on Jun. 6, 2002, now Pat. No. 6,674,758.

(51) Int. Cl.
*H04L 12/28* (2006.01)
(52) U.S. Cl. ....................... 370/401; 370/449
(58) Field of Classification Search ................ 370/352, 370/351, 353, 354, 400, 401, 402, 409, 410, 370/411; 379/142.07, 221.01; 726/11, 12, 726/13; 713/153
See application file for complete search history.

(56) References Cited

U.S. PATENT DOCUMENTS

| | | | |
|---|---|---|---|
| 6,061,798 A * | 5/2000 | Coley et al. .................... | 726/12 |
| 6,243,749 B1 | 6/2001 | Sitaraman et al. | |
| 6,483,470 B1 | 11/2002 | Hohnstein et al. | |
| 6,501,423 B2 | 12/2002 | Kelly et al. | |
| 6,510,154 B1 | 1/2003 | Mayes et al. | |
| 6,523,068 B1 | 2/2003 | Beser et al. | |
| 6,614,781 B1 | 9/2003 | Elliott et al. | |
| 6,674,758 B2 | 1/2004 | Watson | |
| 7,047,561 B1 * | 5/2006 | Lee ............................. | 726/12 |
| 7,369,537 B1 * | 5/2008 | Kirchhoff et al. ........... | 370/352 |
| 2002/0124189 A1 | 9/2002 | Bakke | |
| 2002/0150083 A1 * | 10/2002 | Fangman et al. ............ | 370/352 |
| 2003/0033418 A1 * | 2/2003 | Young et al. ................ | 709/230 |
| 2003/0091046 A1 | 5/2003 | Fang et al. | |
| 2003/0152068 A1 | 8/2003 | Balasaygun et al. | |
| 2005/0039051 A1 * | 2/2005 | Erofeev ....................... | 713/201 |
| 2005/0111382 A1 * | 5/2005 | Le et al. ...................... | 370/254 |
| 2005/0125697 A1 * | 6/2005 | Tahara ......................... | 713/201 |
| 2005/0235349 A1 * | 10/2005 | Boyle et al. ................... | 726/11 |
| 2006/0056409 A1 * | 3/2006 | Piche et al. ................. | 370/389 |
| 2007/0192508 A1 * | 8/2007 | Sollee ......................... | 709/245 |
| 2008/0104273 A1 * | 5/2008 | Bruck et al. ................. | 709/238 |

OTHER PUBLICATIONS

Corner, W., Internetworking with TCP/IP, 2000, Prentice Hall, 4th Edition, vol. 1, pp. 394-400.

* cited by examiner

*Primary Examiner*—Olisa Anwah
(74) *Attorney, Agent, or Firm*—Blakely, Sokoloff, Taylor & Zafman LLP

(57) ABSTRACT

According to one embodiment, a network is disclosed. The network includes a first Voice Over Internet Protocol (VOIP) station a first communication medium coupled to the VOIP station a router, coupled to the first communication, that includes a network address translation (NAT) firewall, a second communication medium coupled to the router and a public proxy/gatekeeper (PPG) coupled to the second communication. The PPG masquerades un-translated NAT IP addresses received from the first VOIP station.

12 Claims, 8 Drawing Sheets

MECHANISM FOR IMPLEMENTING VOICE OVER IP TELEPHONY BEHIND NETWORK FIREWALLS

This application is a divisional application of Ser. No. 10/693,107, filed on Oct. 24, 2003 now U.S. Pat. No. 7,009,984, entitled "Mechanism for Implementing Voice Over IP Telephony Behind Network Firewalls", currently allowed, which is a continuation of Ser. No. 10/164,503 filed Jun. 6, 2002 now U.S. Pat. No. 6,674,758, issued on Jan. 6, 2004, and claims priority thereof.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention-relates to the field of Internet telephony; more particularly, the present invention relates to implementing Voice Over IP (VOIP) communications behind network address translation firewalls.

BACKGROUND

Recently, Internet telephony has been gaining world-wide popularity. Internet telephony involves the use of a multimedia personal computer (PC) or handheld device to complete Voice Over Internet Protocol (VOIP) calls using the Internet as a transport medium. Gateways have even been established in various cities in order to permit VOIP calls to be completed to a regular telephone on the Switched Telephone Network (STN).

While VOIP appears to be an attractive alternative to the traditional Public Service Telephone Network (PSTN) voice connections, it has remained foreign to small-office/home-office and consumers for various reasons. First, difficulty in configuration and installation has discouraged retailers because of technical support issues. In addition, a limited availability of public Internet addresses available to Digital Subscriber (DSL) customers limits the number of users on a network. Typically, ninety percent (90%) of the currently installed DSL connections have only one public address available. This address is usually taken with a single PC, or multiple PCs sharing the one public address by use of a DSL Network Address Translating (NAT) router.

The above problems once plagued the PC industry, where multiple PCs could not share one connection to the Internet because only one address was available. Thus, NAT DSL routers solved the problem of limited addresses by masquerading many private Internet addresses into one public Internet address, while at the same time solving the technical support issues by removing the difficulty of configuring the PC by utilizing Dynamic Host Configuration Protocol (DHCP). These NAT routers have become very popular, as millions are installed thru-out the world.

Because VOIP protocols send address information embedded within the data portion of the protocol packet, the masquerading process of NAT routers is insufficient for such protocols. The ability to deliver a public call to a private VOIP device located behind the NAT router also poses problems preventing VOIP devices from utilizing NAT routers to solve the problems above.

Therefore, a mechanism to enable VOIP communications, with multiple plug and play VOIP devices, with both incoming (called) and outgoing (calling) capability, all operating behind one NAT router sharing one public Internet address, is desired.

SUMMARY

According to one embodiment, a network is disclosed. The network includes a first Voice Over Internet Protocol (VOIP) station a first communication medium coupled to the VOIP station a router, coupled to the first communication, that includes a network address translation (NAT) firewall, a second communication medium coupled to the router and a gatekeeper/public proxy (PPG) coupled to the second communication. The PPG masquerades un-translated NAT IP addresses received from the first VOIP station. According to a further embodiment, the PPG assigns one or more dedicated ports for the first VOIP station to implement VOIP communications from behind the NAT firewall.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
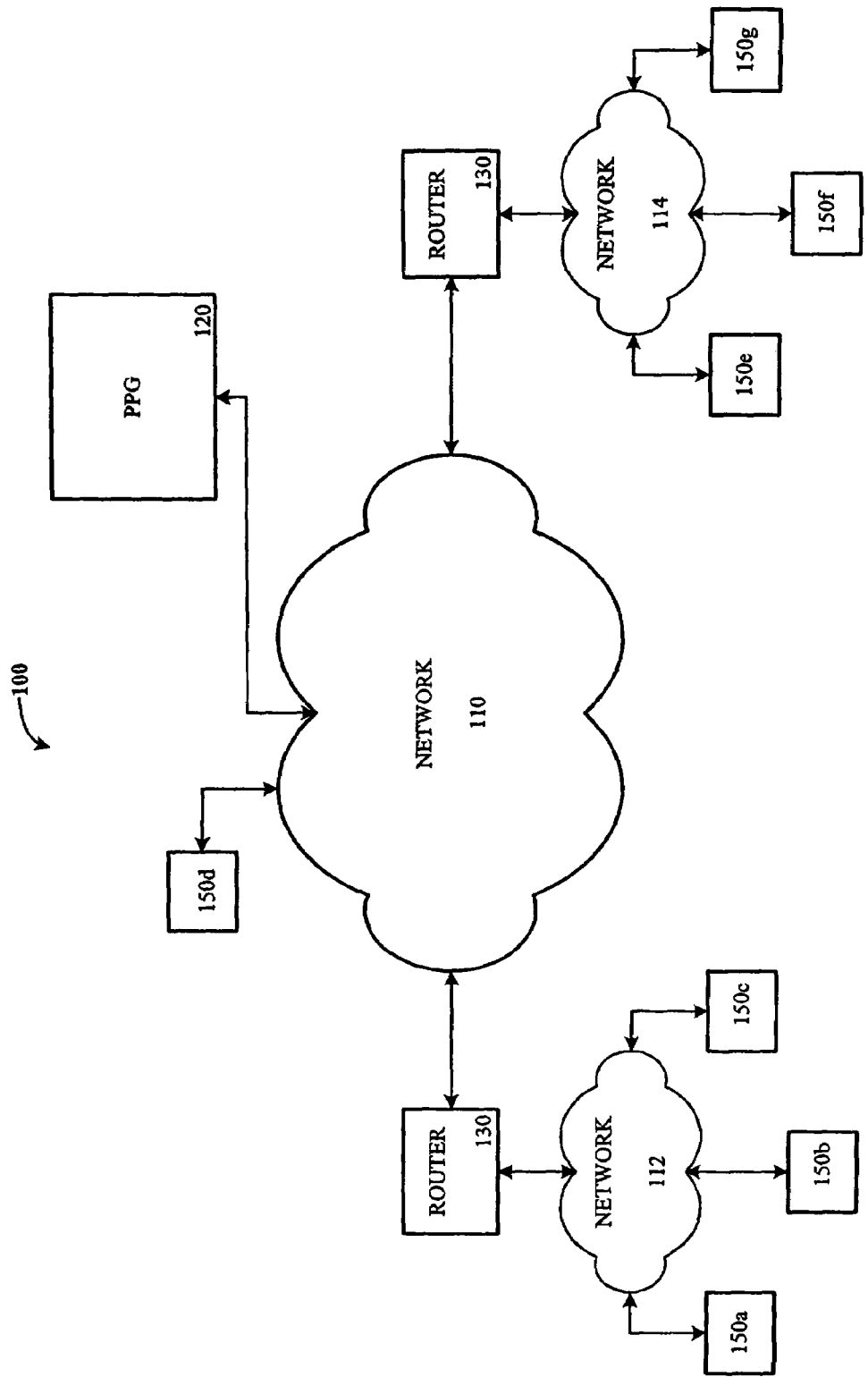
FIG. 1 illustrates one embodiment of an end-to-end network configuration.

According to one embodiment, a method for accessing and operating voice-over-IP (VOIP) stations behind firewalls is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result.

The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

An Exemplary Network Architecture

FIG. 1 is a block diagram of one embodiment of a network 100. Network 100 includes networks 110, 112 and 114. In addition, network 100 includes public proxy/gatekeeper (PPG) 120, routers 130 and stations 150. According to one embodiment, network 110 is an Internet Protocol (IP) network, such as the Internet (or World Wide Web (the WWW)). However, one of ordinary skill in the art will appreciate that network 110 may be implemented using other types of networks without departing from the scope of the present invention.

Networks 112 and 114 are coupled to network 110 via routers 130. In one embodiment, networks 112 and 114 are local area network (LAN) or wide area network (WAN) IP networks, such as the Internet (or World Wide Web (the WWW)). Routers 130 determine the next network point to which a data packet traveling through network 100 should be forwarded toward its destination. In particular, routers 130 transfer data packets between network 110 and networks 112 and 114. According to one embodiment, routers 130 are implemented using software. However in other embodiments, routers 130 may be implemented using a hardware device.

Networks 110, 112 and 114 each have stations 150 coupled thereto. In one embodiment, stations 150 are VOIP stations that are used for real-time bi-directional multimedia communications. In a further embodiment, stations 150 operate according to Version 4 of the H.323 Standard specified by the ITU-T Study Group 16. H.323 specifies the components, protocols and procedures that provide multimedia communication services—real-time audio, video, and data communications—over packet networks, including Internet protocol (IP)-based networks. One of ordinary skill in the art will appreciate that other VOIP protocols, such as sessions initiated protocol (SIP), and H.323 versions may be implemented without departing from the true scope of the invention.

As described above, stations 150 enable a user to establish real-time communications with another station 150 user in networks 110, 112 or 114, or a user on network 116. A station 150 may be a PC or a stand-alone device (e.g., a personal digital assistant (PDA), IP telephone, etc.) running an H.323 stack and media applications. Stations 150 support audio communications. However, according to one embodiment, stations 150 also support video and data communications. Stations 150 will be discussed in more detail below.

PPG 120 provides call control services for stations 150, such as address translation, admissions control and bandwidth control as defined within the H.225 Registration, Admission and Status (RAS) protocol. PPG 120 will be described in further detail below.

During an exemplary VOIP telephone call between endpoints (e.g., a call from station 150a in network 112 to station 150f in network 114), the initiating station 150a transmits a call setup to PPG 120. In response, PPG 120 finds the IP address of station 150f from a database. Subsequently, PPG 120 transmits a setup to station 150f.

Station 150f then transmits an alerting message to PPG 120 indicating that station 150f is ready for the call from station 150a. PPG 120 transmits the alerting message to station 150a. Once station 150f is answered by a user, PPG 120 transmits a connect signal to station 150a. As a result, station 150a sets up a direct connection with station 150f and begins the exchange of voice and/or video media data.

According to one embodiment, firewalls are integrated with one or more of routers 130. For instance, the firewalls may be network address translation (NAT) firewalls that enable a private network with a multitude of private IP addresses to share one public IP address of router 130. A NAT protects networks 112 and 114 from unwanted Internet traffic from network 110. Particularly, the NAT firewall protects the networks by not letting any device outside of the network directly access any device (e.g., stations 150) on the network and behind the firewall.

The NAT firewall acts as an interpreter between network 110 and/or networks 112 and 114. Network 110 is considered the 'public' side and networks 112 and 114 are considered the 'private' side. Whenever a device on the private side requests data from the public side (the Internet), the NAT device will open a portal between a private device and a destination device.

In addition, the NAT firewall, or an associated proxy server, will translate the private address to a public address. This process is known as masquerading. When the public device returns results from the request, it is passed back through the NAT device to the requesting private device. Thus, a NAT enables a relatively large private network to use a small set of public IP addresses.

The problem is that the private IP address of a station 150 on the private side does not get masqueraded by the NAT, or the proxy, because the address is embedded in the data portion of the packet as opposed to the packet header. Consequently, the private IP addresses of stations 150 slip through the NAT firewall. Whenever the PPG receives data from a station 150 behind the NAT, it attempts to transmit directly back to the private address. Accordingly, the data is never received back at the station 150.

Another problem is that dynamic ports are used by the stations 150 for session bundling of media streams. The problem is that if a station 150 dynamically selects a port, the PPG will not be able to find the station 150. Thus, the station 150 will never receive data back in response to a transmission.

According to one embodiment, PPG 120 masquerades un-translated NAT IP addresses in order to keep track of registered stations 150 behind firewalls. In a further embodiment, PPG 120 assigns dedicated ports for each station 150 behind a NAT firewall during registration. In yet another embodiment, each registered station 150 includes a heartbeat generator that intermittently opens associated ports to enable communication to be initiated by PPG 120.

PPG Embodiment

PPG 120 provides call-control services for stations 150. Such services include address translation, bandwidth management as defined within RAS and call-signaling routing. During call signaling, station 150 sends call-signaling messages to PPG 120, which PPG 120 routes to a destination station 150. Thus, PPG 120 monitors the calls and provides control of the calls in the network. According to one embodiment, PPG 120 assigns fixed ports to each station 150 during registration.

Figure 2:
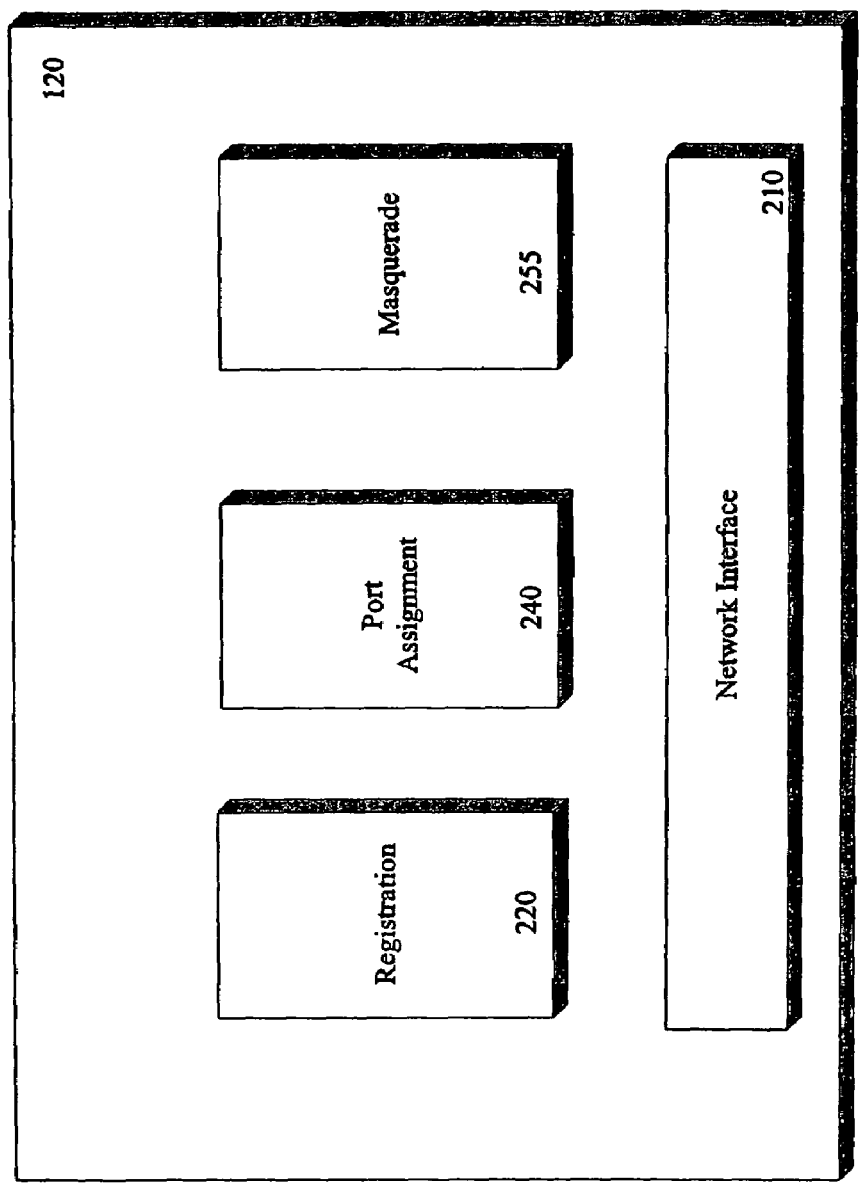
FIG. 2 illustrates one embodiment of a gatekeeper.

FIG. 2 illustrates one embodiment of PPG 120. PPG 120 includes network interface 210, registration module 220, port assignment module 240 and a masquerade module 255. Network interface 210 serves as an interface to allow PPG 120 to connect to other network devices via network 110.

Registration module 220 receives registration requests from stations 150 in order to register with PPG 120 for VOIP communications. In one embodiment, PPG 120 receives the media access control (MAC) address alias from a station 150 as a part of registration.

According to a further embodiment, the MAC address for each station 150 and a corresponding telephone number are previously stored in a database associated with PPG 120. In such an embodiment, the information is stored in the database upon the station 150 user signing up with a service provider. Once registration module 220 receives the MAC address during registration, PPG 120 accesses the telephone number and stores the number storage for future address translation applications.

After the registration process is completed, registration module 220 transmits a registration confirmation to the station 150. In one embodiment, the confirmation includes an index value calculated by port assignment module 240. The index value is calculated by port assignment module 240 in order to assign one or more dedicated ports for a station 150 behind a firewall.

If it is determined that a station 150 is behind a firewall, port assignment module 240 accesses a database to determine how many stations 150 on the same firewall (e.g., registered stations 150 with the same public IP address) that have previously been registered at PPG 120. According to one embodiment, the number of registered stations 150 behind the same firewall is then assigned as the index value.

For example, if station 150a is behind a firewall in network 112, and is the first to register at PPG 120, port assignment module 240 will find that no previous station 150 in network 112 has been registered. Thus, an index value of zero is transmitted to station 150 during registration confirmation. Similarly, if station 150b is the second to register, it will receive an index value of one.

According to a further embodiment, a station 150 may be removed from the PPG 120 registry. In such an embodiment, a port behind a firewall may be unused even though it has previously been assigned. Thus, port assignment module 240 calculates the index value based upon the first port available.

For example, in a system with three ports previously assigned to stations 150a-150c, in which station 150b has been removed from the registry, port assignment module 240 calculates an index value of two, rather than four. Thus, after a station 150 is removed, port assignment module 240 fills up unused ports before assigning new ports.

According to another embodiment, since the least significant byte of each private IP address behind a firewall is unique, the index value is assigned as the least significant byte of the private address. For instance if the private IP address is 192.168.1.9, the index value would be 9.

Masquerade module 255 performs address translation of addresses received at PPG 120. As discussed above, stations 150 behind NAT firewalls have private IP addresses that do not get masqueraded by the NAT, or an associated proxy. As a result, the private IP addresses slip through the NAT firewall. In one embodiment, masquerade module 255 translates the private IP addresses received at PPG 120 from stations 150 behind NAT firewalls into the public address of the network from which the data was received.

According to one embodiment, masquerade module 255 examines each packet received at PPG 120. Further masquerade module 255 compares an IP address embedded within the data portion of each received packet to a source IP address in the packet header indicating the source of the packet.

If the embedded address does not match the source address, masquerade module 255 recognizes that the station 150 is behind a firewall. Subsequently, masquerade module 255 masquerades the private IP address by translating the address into the source public IP address corresponding with the NAT firewall. During registration, the private IP address and the masqueraded address are stored. In one embodiment, masqueraded address is also forwarded to port assignment module 240 for calculation of the index value.

In the embodiment implementing the least significant byte of the private address for port assignment, the least significant byte of the un-masqueraded private address is forwarded to port assignment module 240 for calculation of the port value.

Station Embodiment

Station 150 is used for bi-directional multimedia communications. As described above, station 150 may be a fixed or wireless VOIP telephones. In such embodiments, stations 150 are configured to be plug and play devices that enable users to freely connect to a global wide area network (e.g., network 116) via any fixed or wireless local area network.

For instance, a station 150 may be purchased from the shelf of a retail store, plugged in at a user's home or office, and will begin operation by automatically registering with PPG 120 with its MAC address. Moreover, a station 150 on a network (e.g., network 112) may be removed from the network and connected in other networks (e.g., networks 110 or 114) without manual reconfiguration. Therefore, stations 150 are not limited to a closed system.

In a further embodiment, each station 150 behind a NAT firewall is logically coupled to the NAT via dedicated (or fixed) ports. Having fixed ports that are periodically opened with a heartbeat (or dummy packet) enables each station 150 to receive connection data at any time.

Figure 3:
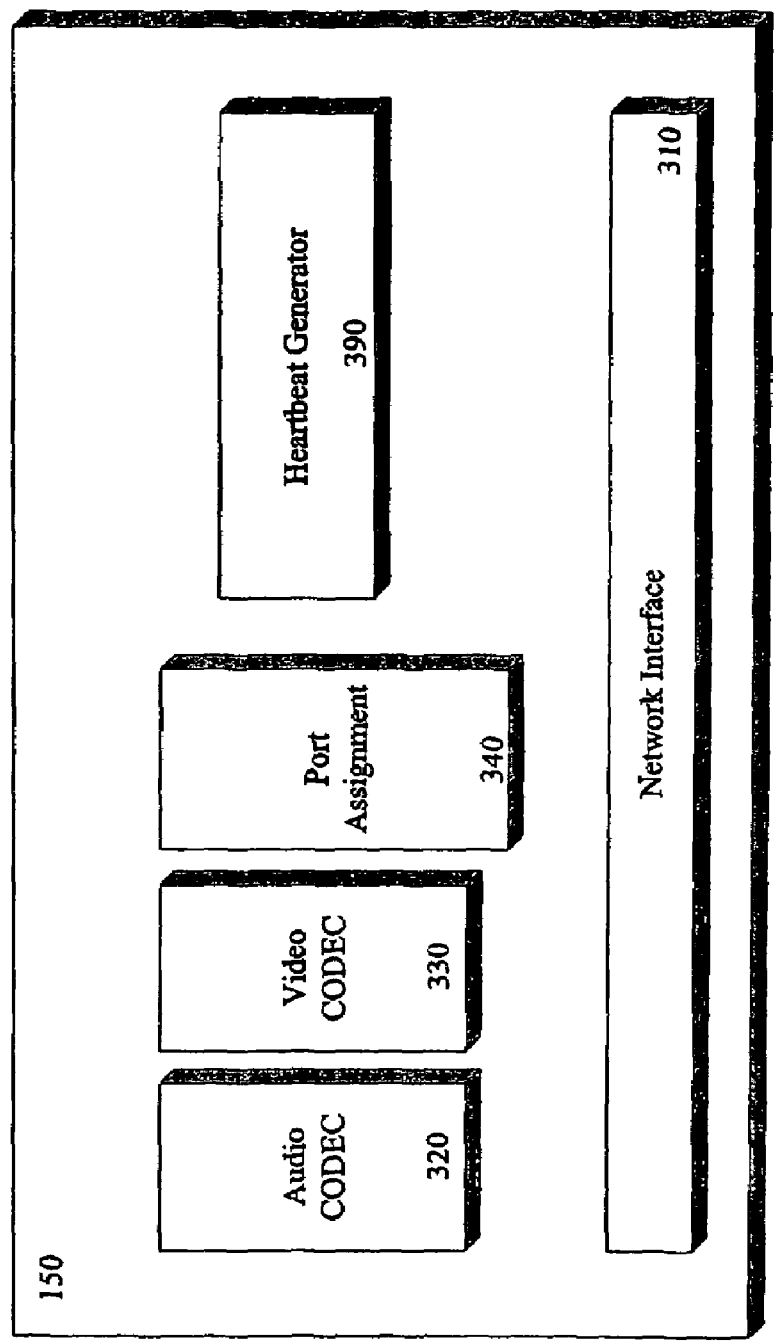
FIG. 3 illustrates one embodiment of a VOIP station.

FIG. 3 illustrates one embodiment of a station 150. Station 150 includes network interface 310, audio code/decode (CODEC) module 320, video CODEC 330, port assignment module 340 and heartbeat generator 390. Network interface 210 serves as an interface to allow station 150 to connect to other network devices via network 110.

Audio CODEC 320 encodes the audio signal from a microphone for transmission on the transmitting station 150 and decodes the received audio code that is sent to the speaker on the receiving station 150. In one embodiment, audio CODEC 320 supports the ITU-T G.711 recommendation. However, CODEC 320 may also support additional recommendations such as G.722 (64, 56, and 48 kbps), G.723.1 (5.3 and 6.3 kbps), G.728 (16 kbps), and G.729 (8 kbps).

Video CODEC 330 encodes video from a camera for transmission on the transmitting station 150 and decodes the received video code that is sent to the video display on the receiving station 150. In one embodiment, video CODEC supports video encoding and decoding as specified in the ITU-T H.261 recommendation.

Port assignment module 340 assigns a dedicated port to the station 150 if the station 150 is behind a firewall. The dedicated port is assigned based upon the index value received from PPG 120 during registration, or based upon the value of the least significant byte of its private IP address in the least significant byte embodiment described above. In one embodiment, each station 150 is assigned a base port by the manufacturer. For instance, each station 150 may be assigned a base port of 2000.

According to a further embodiment, port assignment module 340 assigns the dedicated port by adding the index value to the base port. Thus, if the station 150 receives an index value of ten (e.g., station 150 is the tenth station behind the firewall to be registered), station 150 will be assigned port 2010.

In the least significant byte embodiment, port assignment module 340 assigns the dedicated port by adding the least significant byte value to the base port. For example if the private IP address is 192.168.1.8 the station 150 will be assigned port 2008.

Although the current embodiment has been described using one dedicated port, one of ordinary skill in the art will recognize that the invention may be implemented in protocols using multiple ports. In such embodiments, the index value is used to increment multiple base ports programmed into the station 150.

Heartbeat (or dummy packet) generator 390 opens the one or more dedicated ports associated with station 150 at intermittent intervals. In particular, heartbeat generator 390 includes a counter that increments its count during each clock cycle of a system clock within station 150. Further, in order to keep the port open, heartbeat generator 390 transmits dummy packets to the port upon the counter reaching a predetermined threshold count. Heartbeat generator 390 opening the various ports does not pose a security risk since only voice and/or video data is received via the dedicated ports.

Figure 4:
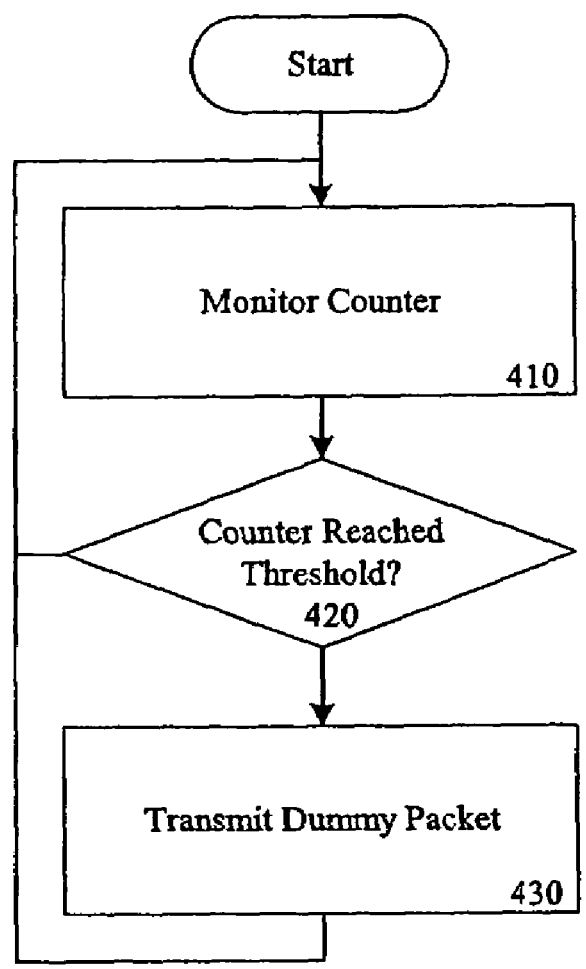
FIG. 4 illustrates one embodiment of a flow diagram for the operation of a heartbeat generator.

FIG. 4 illustrates one embodiment of a flow diagram for the operation of heartbeat generator 390. At processing block 410, heartbeat generator 390 monitors the counter. At decision block 420, heartbeat generator 390 determines whether the counter has reached the predetermined threshold count. According to one embodiment, the assigned port for station 150 doses thirty minutes after it has last been used. Accordingly, in such an embodiment, the counter is configured to reach the threshold count every twenty-nine minutes. However, one of ordinary skill in the art will appreciate that the counter may reach the threshold count at different intervals depending upon the firewall configuration.

If the counter has not reached the predetermined threshold count, control is returned to processing block 410 where heartbeat generator 390 continues to monitor the counter. If the counter has reached the threshold count, heartbeat generator 390 transmits a packet to the port, processing block 430. Consequently, any ports that have dosed are reopened. Subsequently, control is returned to processing block 410 where heartbeat generator continues to monitors the counter to determine if the threshold count has been reached.

System Operation

Upon a station 150 being plugged into a particular network, a PPG discovery process is initiated. The PPG discovery process is used by the station 150 to determine the PPG with which the station 150 must register. The PPG discovery can be done statically or dynamically. In static discovery, the station 150 knows the transport address of its PPG 120. In the dynamic method of PPG discovery, the station 150 multicasts a GRQ message on the PPG's discovery multicast address: "Who is my PPG?" As a result, PPG 120 responds with a GCF message: "I can be your PPG".

Once station 150 finds PPG 120, station 150 downloads a profile (e.g., PPG address and parameters) from PPG 120. Subsequently, the registration process is commenced. Registration is a process used by a station 150 to join a VOIP zone and inform PPG 120 of the zone's transport and alias addresses. All stations 150 register with PPG 120 as part of their configuration.

Figure 5:
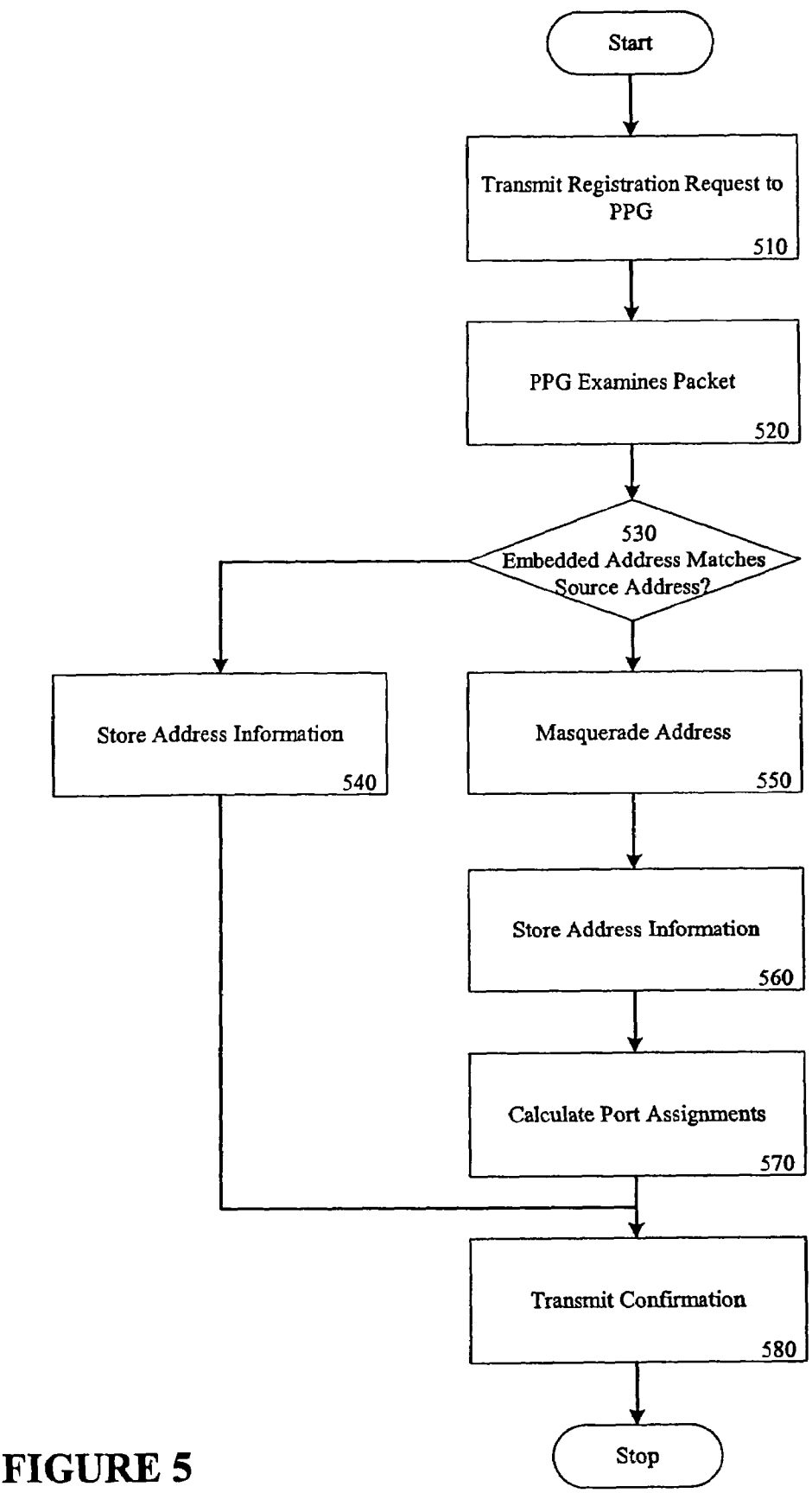
FIG. 5 illustrates one embodiment of a flow diagram for one embodiment of a registration process.

FIG. 5 illustrates one embodiment of a flow diagram for one embodiment of a registration process. At processing block 510, a registration request is transmitted from station 150 to PPG 120 by transmitting a packet with registration data. At processing block 520, PPG 120 examines the received packet. As discussed above, PPG 120 compares an IP address embedded within the data portion of the packet to the source IP address in the packet header indicating the source of the packet.

At decision block 530, it is determined whether the embedded address matches the source address. If there is a match, PPG 120 recognizes that station 150 sits on a public network (e.g., network 110). As a result, the public IP address and station 150 MAC address is stored at PPG 120, processing block 540. If, however, there is a mismatch between the addresses, PPG 120 recognizes that station 150 is behind a firewall. Accordingly, at processing block 550, PPG 120 masquerades the private IP address by translating the address into the source public IP address corresponding with the NAT firewall.

At processing block 560, PPG 120 notes that station 150 is behind a firewall and stores the public IP address, the private IP address, the MAC address and the telephone number. As described above, the station 150 MAC address and telephone number are previously stored in a database associated with PPG 120. Once PPG 120 receives the address during the registration process, PPG 120 accesses the telephone number for storage for future address translation applications.

At processing block 570, PPG 120 calculates an index value based upon the first port available for station 150 behind the firewall. Alternatively, the index value is calculated based upon the least significant byte of the private IP address discussed above. At processing block 580, PPG 120 transmits a registration confirmation to the particular station 150. Once a particular station 150 is registered, the station may initiate or receive telephone calls. Call messages are exchanged between stations 150 after being routed through the PPG 120 in a process called routed call signaling.

Figure 6A:
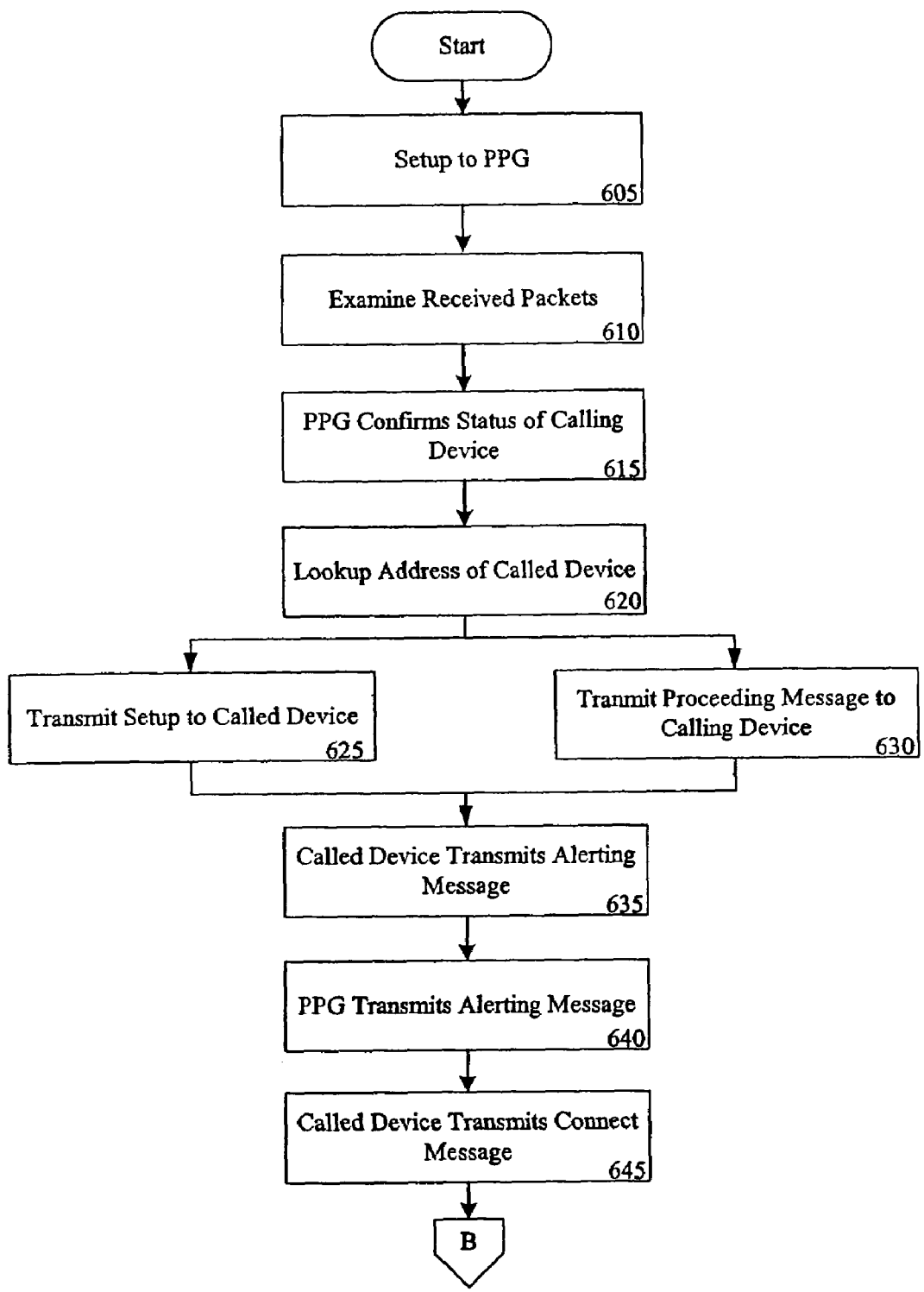
FIG. 6 illustrates one embodiment of a flow diagram for a call signaling operation.
Figure 6B:
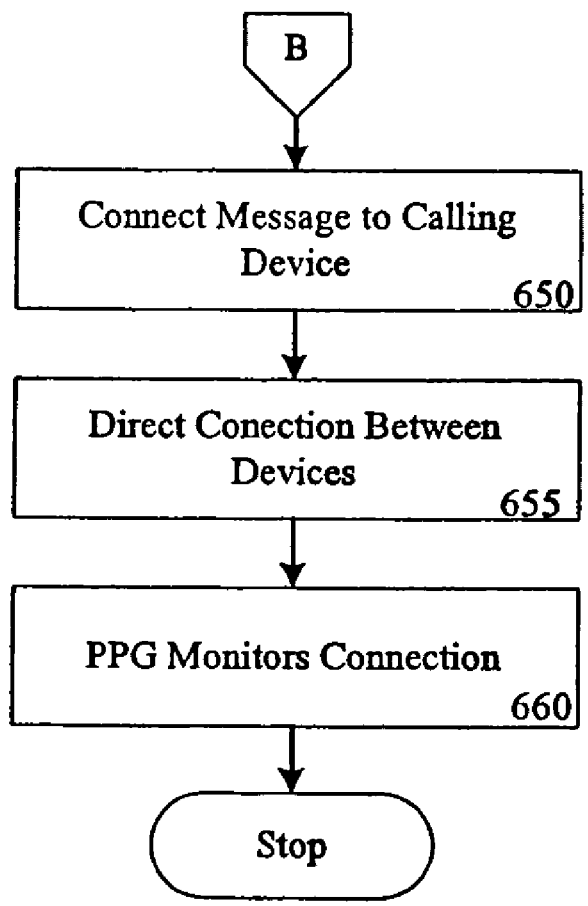

FIGS. 6A and 6B illustrate one embodiment of call signaling implemented in networks 110, 112 and 114. Call signaling begins when a user at a particular station 150 (e.g. station 150*a*) attempts to call another station 150 (e.g., station 150*f*) by dialing the telephone number of the station 150.

Referring to FIG. 6A, a setup/invite message is transmitted to PPG 120 once the user at station 150*a* dials the telephone number, processing block 605. The setup information includes the calling station's identity, such as MAC address, and the called station's telephone number (e.g., the number called).

At processing block 610, PPG 120 examines the packets received from station 150*a* to determine if station 150*a* is behind a firewall, and masquerades the address if necessary. At processing block 615, PPG 120 confirms that the calling station 150 has an account that is currently active. For instance, PPG 120 controls the access by the calling station 150 by ensuring that the calling station 150 has paid all accounts current.

If the account is current, PPG 120 looks up the address of the called station 150 to find its public IP address, processing block 620. Thus, PPG 120 confirms whether the called station 150 has been registered. Note that if the called station 150 is behind a firewall, PPG 120 retrieves the masqueraded address.

At processing block 625, PPG 120 transmits the setup/invite to the called station 150. Note that the setup may be received at a called station 150 behind a firewall since PPG 120 has established dedicated ports during registration. Moreover those ports, as discussed above, are intermittently opened so that setup messages may be received.

At processing block 630, PPG 120 transmits a proceeding message to the calling station 150 indicating that the call has been forwarded to the called station 150. At processing block 635, the called station 150 transmits an alerting message to PPG 120. The alerting message indicates that the called station 150 is ringing.

At processing block 640, PPG 120 forwards the alerting message to the calling station 150 if the message has been received. Once the call is answered at the called station 150, a connect message is transmitted to PPG 120 from the called station 150, processing block 645. Referring to FIG. 6B, the connect message is forwarded by PPG 120 to the calling station 150, processing block 650. At processing block 655, a direct connection is established between the calling station 150 and the called station 150. At processing block 660, PPG 120 monitors the connection and maintains a record of the connection.

As discussed above, the masquerading of private addresses into public addresses and establishing dedicated ports at PPG 120, as well a heartbeat generator at the stations 150 enable VOIP communications at stations 150 behind NAT firewalls.

An Exemplary Computer Architecture

Figure 7:
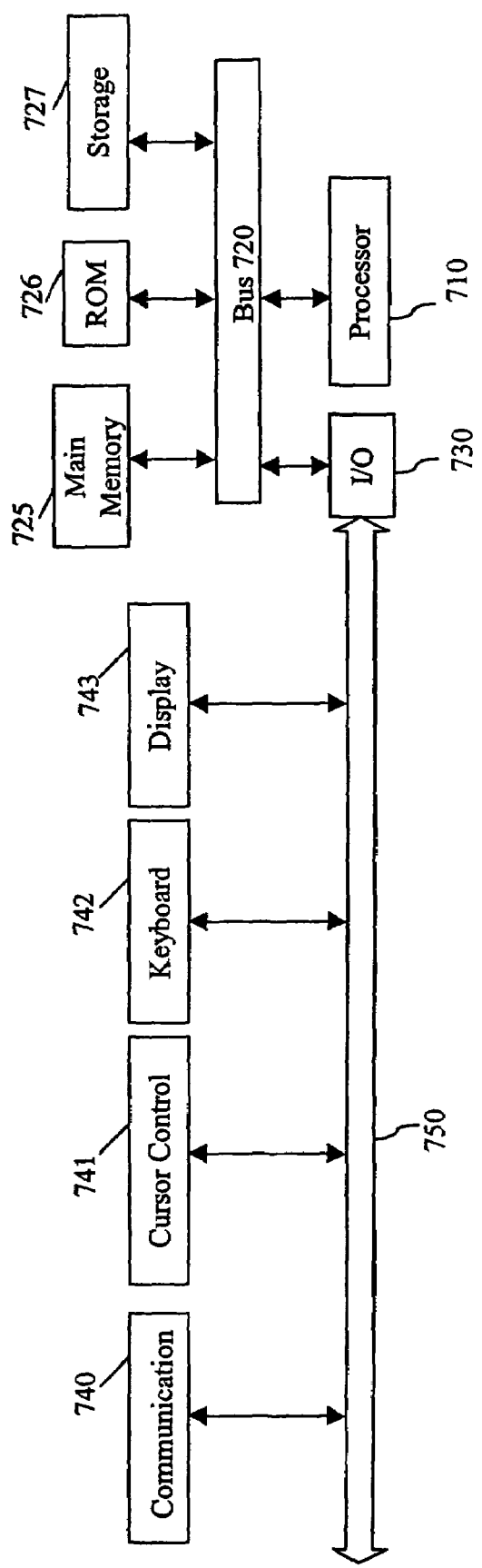
FIG. 7 illustrates an exemplary computer system.

Having described an exemplary interactive system and network architecture that employs various elements of the present invention, a computer system 700 representing an exemplary PPG 120 and/or stations 150 in which elements of the present invention may be implemented will now be described with reference to FIG. 7.

One embodiment of computer system 700 includes a system bus 720 for communicating information, and a processor 710 coupled to bus 720 for processing information. Computer system 700 further comprises a random access memory (RAM) or other dynamic storage device 725 (referred to herein as main memory), coupled to bus 720 for storing information and instructions to be executed by processor 710.

Main memory 725 also may be used for storing temporary variables or other intermediate information during execution of instructions by processor 710. Computer system 700 also may include a read only memory (ROM) and/or other static storage device 726 coupled to bus 720 for storing static information and instructions used by processor 710.

A data storage device 727 such as a magnetic disk or optical disc and its corresponding drive may also be coupled to computer system 700 for storing information and instructions. Computer system 700 can also be coupled to a second I/O bus 750 via an I/O interface 730. A plurality of I/O devices may be coupled to I/O bus 750, including a display device 743, an input device (e.g., an alphanumeric input device 742 and/or a cursor control device 741). For example, video news clips and related information may be presented to the user on the display device 743. Moreover, a printer 744 may be included in computer 700 to provide hard copies of documents.

The communication device 740 is for accessing other computers (servers or clients) via network 710. The communication device 740 may comprise a modem, a network interface card, or other well-known interface device, such as those used for coupling to Ethernet, token ring, or other types of networks.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method for accessing and operating VOIP stations behind firewalls has been described.

What is claimed is:

1. A network comprising:
   a network firewall; and
   two or more stations implementing Voice Over Internet Protocol (VOIP), coupled to the firewall, each station including:
   a port assignment module to assign a dedicated port to the station using a pre-assigned base port value; and
   a heartbeat generator to transmit dummy packets to the dedicated port at predetermined intervals to keep open the dedicated port to enable call signaling from devices external to the firewall.

2. The network of claim 1 wherein the heartbeat generator transmits the dummy packets upon a counter reaching the predetermined interval.

3. The network of claim 1 wherein the base port value is assigned by a manufacturer of the station.

4. The network of claim 1 wherein the dedicated port is assigned by adding an index value received from a proxy/gatekeeper (PPG) to the base port value.

5. The network of claim 1 wherein the dedicated port is assigned by adding the least significant byte of a private IP address of the station to the base port value.

6. The network of claim 1 further comprising:
- an audio CODEC to encode and decode audio data at the station; and
- a video CODEC to encode and decode video data at the station.

7. A Voice Over Internet Protocol (VOIP) station comprising:
- a port assignment module to assign a dedicated port to the station using a pre-assigned base port value; and
- a heartbeat generator to transmit dummy packets to the dedicated port at predetermined intervals to keep open the dedicated port to enable call signaling from devices external to the firewall.

8. The station of claim 7 wherein the heartbeat generator transmits the dummy packets upon a counter reaching the predetermined interval.

9. The station of claim 7 wherein the base port value is assigned by a manufacturer of the station.

10. The station of claim 7 wherein the dedicated port is assigned by adding an index value received from a proxy/gatekeeper (PPG) to the base port value.

11. The station of claim 7 wherein the dedicated port is assigned by adding the least significant byte of a private IP address of the station to a the base port value.

12. The station of claim 7 further comprising:
- an audio CODEC to encode and decode audio data at the station; and
- a video CODEC to encode and decode video data at the station.

* * * * *